(12) United States Patent
Evans

(10) Patent No.: US 11,119,943 B2
(45) Date of Patent: Sep. 14, 2021

(54) HANDLING ADDRESS TRANSLATION REQUESTS

(71) Applicant: ARM LIMITED, Cambridge (GB)

(72) Inventor: Matthew Lucien Evans, Cambridge (GB)

(73) Assignee: Arm Limited, Cambridge (GB)

(*) Notice: Subject to any disclaimer, the term of this patent is extended or adjusted under 35 U.S.C. 154(b) by 530 days.

(21) Appl. No.: 15/019,069

(22) Filed: Feb. 9, 2016

(65) Prior Publication Data
US 2016/0259735 A1 Sep. 8, 2016

(30) Foreign Application Priority Data

Mar. 2, 2015 (GB) .................................. 1503506

(51) Int. Cl.
 *G06F 12/1036* (2016.01)
(52) U.S. Cl.
 CPC .... *G06F 12/1036* (2013.01); *G06F 2212/152* (2013.01); *G06F 2212/68* (2013.01)
(58) Field of Classification Search
 CPC .. G06F 12/02; G06F 12/0292; G06F 12/1036; G06F 12/10
 See application file for complete search history.

(56) References Cited

U.S. PATENT DOCUMENTS

| | | | |
|---|---|---|---|
| 5,784,707 A | 7/1998 | Khalidi et al. | |
| 6,594,710 B1 * | 7/2003 | Cohen ................. | G06F 12/0292 365/230.01 |
| 7,278,008 B1 * | 10/2007 | Case ................... | G06F 12/1036 710/26 |
| 2004/0105298 A1 * | 6/2004 | Symes ................. | G06F 9/4812 365/149 |
| 2009/0222816 A1 | 9/2009 | Mansell et al. | |
| 2009/0292899 A1 * | 11/2009 | Mansell .............. | G06F 12/1009 711/207 |
| 2011/0238946 A1 * | 9/2011 | Rajamony ........... | G06F 12/0207 711/203 |
| 2012/0317377 A1 * | 12/2012 | Palay .................. | G06F 12/0246 711/154 |

(Continued)

FOREIGN PATENT DOCUMENTS

| | | |
|---|---|---|
| CN | 101520753 | 9/2009 |
| CN | 102804153 | 11/2012 |
| CN | 103995732 | 8/2014 |

OTHER PUBLICATIONS

Search Report for GB1503506.6 dated Sep. 1, 2015, three pages.
(Continued)

*Primary Examiner* — Sanjiv Shah
*Assistant Examiner* — Alexander J Yoon
(74) *Attorney, Agent, or Firm* — Nixon & Vanderhye P.C.

(57) ABSTRACT

A memory management unit comprises an interface for receiving an address translation request from a device, the address translation request specifying a virtual request to be translated. Translation circuitry translates the virtual address into an intermediate address different from a physical address directly specifying a memory location. The interface provides an address translation response specifying the intermediate address to the device in response to the address translation request. This improves security by avoiding exposure of physical addresses to the device.

16 Claims, 5 Drawing Sheets

(56) References Cited

U.S. PATENT DOCUMENTS

| | | | |
|---|---|---|---|
| 2013/0013889 A1* | 1/2013 | Devaraj | G06F 12/1483 |
| | | | 711/207 |
| 2013/0262736 A1 | 10/2013 | Kegel et al. | |
| 2014/0047251 A1* | 2/2014 | Kottilingal | G06F 1/3296 |
| | | | 713/320 |
| 2014/0156930 A1* | 6/2014 | Isloorkar | G06F 12/1027 |
| | | | 711/122 |
| 2014/0281332 A1 | 9/2014 | Koob et al. | |
| 2015/0095610 A1* | 4/2015 | Ben-Meir | G06F 12/1027 |
| | | | 711/207 |

OTHER PUBLICATIONS

Examination Report for GB Application No. 1503506.6 dated Mar. 11, 2021, 4 pages.
Office Action for CN Application No. 201610101795.4 dated Jul. 30, 2020 and English translation, 30 pages.
Second Office Action for CN Application No. 201610101795.4 dated Apr. 20, 2021 and English translation, 30 pages.

* cited by examiner

HANDLING ADDRESS TRANSLATION REQUESTS

This application claims priority to GB Patent Application No. 1503506.6 filed 2 Mar. 2015, the entire content of which is hereby incorporated by reference.

BACKGROUND

Technical Field

The present technique relates to the field of data processing. More particularly, it relates to a memory management unit.

Technical Background

A data processing apparatus may have a memory management unit (MMU) for managing accesses to memory.

SUMMARY

In at least some examples, the present technique provides a memory management unit comprising:
an interface configured to receive an address translation request from a device, the address translation request specifying a virtual address to be translated; and
translation circuitry configured to translate the virtual address specified by the address translation request into an intermediate address different from a physical address directly specifying a memory location;
wherein the interface is configured to provide an address translation response comprising the intermediate address to the device in response to the address translation request.

In another example, the present technique provides a data processing apparatus comprising a memory management unit as discussed above.

In another example, the present technique provides a memory management unit comprising:
means for receiving an address translation request from a device, the address translation request specifying a virtual address to be translated;
means for translating the virtual address specified by the address translation request into an intermediate address different from a physical address directly specifying a memory location; and
means for providing an address translation response comprising the intermediate address to the device in response to the address translation request.

In another example, the present technique provides a method comprising:
receiving an address translation request from a device, the address translation request specifying a virtual address to be translated;
translating the virtual address specified by the address translation request into an intermediate address different from a physical address directly specifying a memory location; and
providing an address translation response to the device, the address translation response comprising the intermediate address.

The above, and other objects, features and advantages will be apparent from the following detailed description of illustrative embodiments which is to be read in connection with the accompanying drawings.

DESCRIPTION OF EXAMPLES

Further features and advantages of the present technique will be apparent from the following description of examples, which is to be read in conjunction with the accompanying drawings, in which:

FIG. 1 schematically illustrates an example of a data processing system in which a number of devices access memory through a memory management unit;

FIG. 2 schematically illustrates an example where the MMU is distributed across several devices;

DESCRIPTION OF EXAMPLES

Figure 1:
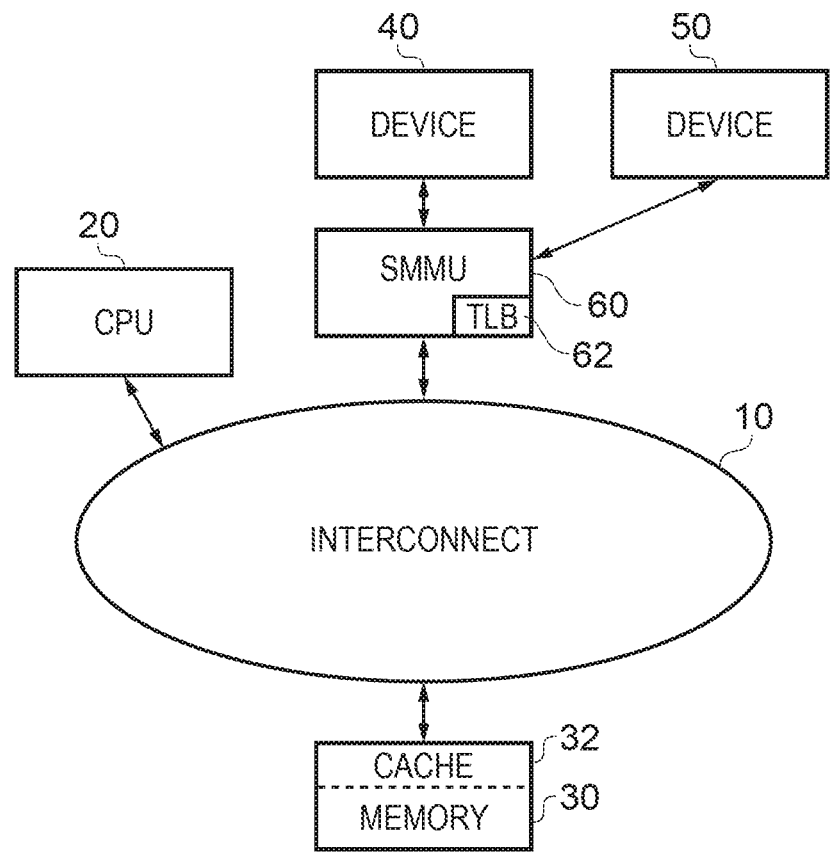

A data processing apparatus may have a memory management unit (MMU) for managing accesses to memory. For example the MMU may be responsible for translating virtual addresses specified by a device wishing to access memory into physical addresses which directly identify the locations to access in memory. The MMU may also control whether a device is allowed to access the requested address based on access permissions set for regions of the address space. The address translation and access permission checking may be controlled using page table entries which may be located within a page table in memory or cached within a translation lookaside buffer (TLB) local to the MMU. If the TLB does not contain the required page table entry for a given access, a page table walk may be required to access the page table entry from the page tables, which can be relatively slow. If multiple devices or contexts contend for access to memory through the MMU, there may not be enough space in the TLB for the page table entries required for each device or context, and so the contention can lead to more frequent page table walks which can affect performance.

To reduce the performance impact of contention for MMU resource, some MMUs may provide an advance address translation function where a client device may send an advance address translation request to the MMU specifying a virtual address to be translated (even if that address does not yet need to be accessed), and the MMU sends a response to the device specifying a physical address corresponding to the virtual address. The physical address can be cached within the device, and later on the device can provide a translated memory access to the MMU specifying the previously cached physical address, so that no further address translation is required at this time. By performing the relatively slow address translation operation ahead of time and caching the result in the client device where it will not contend for MMU storage or bandwidth with other devices or contexts, performance at the time of performing the memory access can be improved.

However, exposing physical addresses to the device may pose a security problem in that this allows the device to send memory access requests to the MMU which do not need to undergo further translation (or access permission checking) since they already have the physical address. If a device can be trusted to only make translated access requests for the physical addresses which were previously returned in response to the address translation request, this may be acceptable since the address translation performed at the time of the address translation request may include any required permission checking. However, if a device cannot be trusted, then this may provide a security vulnerability. For example, a device could attempt a translated memory access which specifies a physical address which was not previously returned in response to an address translation response (either accidentally due to a bug, or deliberately due to malicious code executed by the device). If this memory access is allowed then this could allow a device to access regions of memory which it is not permitted to access, causing a security violation. Therefore, in practice the advance address translation approach has been used only when it is known that all client devices coupled to the MMU are trusted to behave correctly. Often this is not the case and so the advance address translation would need to be disabled. This limits the performance gains which can be achieved by using address translation.

Instead, as discussed herein, in response to the address translation request, the MMU may translate the virtual address specified by the address translation request into an intermediate address which is different from a physical address directly specifying a memory location, and return an address translation response to the device specifying the intermediate address, not the physical address. This avoids exposing physical addresses to the device, making it safe to use the advance address translation feature even if not all the devices coupled to the MMU are trusted. This allows advance address translation to be used more widely, allowing performance savings to be achieved for a larger range of implementations.

The device may send two types of access requests. Non-translated access requests are regular requests for a memory access, which specify a virtual address and do not use the advance address translation feature. Translated access requests are requests for a memory access using a pre-translated address which was previously provided by the MMU in response to an address translation request. The address translation request does not request a memory access to be performed, but merely requests that the MMU returns a translated address which can be used for a translated memory access at a later time.

When the address translation response provides an intermediate address as discussed above, the translated access request will also specify an intermediate address, and in response, the translation circuitry performs a further translation to translate the intermediate address into a corresponding physical address to be used for the memory access. Hence, while the eventual memory access is still to a physical address, with the present technique the translation of a virtual address to an intermediate address may be carried out at the time of the address translation request, and the translation of an intermediate address to a physical address may be carried out at the time of the subsequent translated access request.

For non-translated access requests, the translation circuitry may perform the translation in two stages so that there is a first translation for translating the virtual address into a corresponding intermediate address and then a second translation to translate the intermediate address into the corresponding physical address. A two-stage translation can be useful for supporting a virtualised system, for example. For example the first translation may be controlled using first control data set under control of a first control program executed by a processing unit within the system comprising MMU, and the second translation may be controlled using second control data set under control of a second program executed by the processing unit. For example the first control program could be a guest operating system or virtual machine while the second control program could be a hypervisor for managing a number of guest operating systems or virtual machines. In an MMU which already has two translation stages for non-translated memory accesses, little additional hardware or functionality may be required in order to respond to address translation requests with an intermediate address rather than a physical address, and so the technique discussed above can be implemented with little additional circuit area or energy consumption overhead.

One may think that only translating the virtual address into an intermediate address in response to the address translation request may detract from the main performance advantage of performing an address translation ahead of time, since there is still a second translation required when the translated access request is later made by the device. However, in practice in a two stage translation it is often the first translation which results in greater contention for resource within the MMU. For example if the first translation corresponds to a translation managed by a particular virtual machine or operating system and the second translation is managed by the hypervisor, it is often more likely that there is contention between devices or contexts associated with different virtual machines or operating systems, since each virtual machine or operating system may require different page table data or other control data to be cached within the MMU, increasing the competition for space in the MMU caches. In contrast for the second stage under control of the hypervisor, it is more likely that a number of contexts or devices may be managed with a common set of control data, reducing the likelihood of MMU cache misses due to contention. Therefore, in practice much of the performance gain associated with performing address translations in advance may be achieved by performing only the first translation in advance, even if the second stage translation is performed later when the translated memory access is requested.

Not all address translation requests may result in a response specifying an intermediate address. Some examples may support several different address translation modes which handle address translation requests in different ways.

For example, in a first address translation mode the address translation request may be handled as discussed above so that the virtual address is translated into an intermediate address and then a response is provided to the device specifying the intermediate address. In contrast, in a second address translation mode, a physical address may be returned in response to the address translation request.

When in the first mode, translated access requests will specify an intermediate address and so in response the translation circuitry may perform the translation of the intermediate address into the corresponding physical address to be used for a memory access. In the second mode the translated access request will already specify a physical address and so no further translation may be required and in this case the physical address specified in the request can be used directly for a memory access.

The translation circuitry may select whether to use the first or second mode based on control information accessible to the translation circuitry (e.g. in a control register, cache or main memory). The control information may specify which mode to use separately for different devices or contexts for which access to memory is managed by the MMU. Hence, one device or context may have its address translation requests handled in the first mode, while another may have address translation handled in the second mode. Hence, for devices/contexts which are trusted to behave appropriately, the second address translation mode can be used because this allows the subsequent translated memory accesses to be handled more quickly because no additional translation is required. However, for devices/contexts which are not trusted the MMU may handle address translations in the first mode so that only an intermediate address is exposed to maintain security. By providing both modes, a better balance between security and performance can be achieved.

There may be a performance overhead associated with checking the control information to determine which mode to use for handling address translation requests. For example, the control information may be stored in memory and so there may be a delay in fetching and reading this information. If it is known that all devices are trusted, this delay may be unnecessary.

To further improve performance when devices are trusted, the MMU may be provided with a number of operating modes including a performance mode and a safety mode. In the performance mode, in response to a translated access request received from a device, the MMU may allow a translated memory access to proceed using an address specified by the translated access request without checking whether to use the first address translation mode or the second address translation mode. In the safety mode, the translation circuitry checks whether to use the first or second address translation mode before allowing any memory access to proceed in response to a translated access request.

If all devices can be trusted then the performance mode can be selected so that there is no delay in checking the control information and instead all translated access requests may be assumed to specify a physical address according to the second address translation mode. If there is a concern that at least one device may be untrusted then the safety mode can be selected so that the address translation mode is checked before accessing memory, and if the first address translation mode is selected for that device, a further translation of the intermediate address into the physical address is performed. Hence, providing both a performance mode and a safety mode allows a tradeoff between security and safety which can be selected when implementing a particular system depending on the devices being used.

In some examples, some control information set within the MMU may indicate whether to operate in the safety mode or the performance mode. For example a flag may be provided within the MMU which defines which mode is used.

During the performance mode, accesses to memory are allowed to proceed without checking the address translation mode. At this time, the memory management unit may prohibit use of the first address translation mode when the MMU is in the performance mode, so that any translated access requests received from the device will specify a physical address, not an intermediate address, to avoid security violations caused by intermediate addresses being interpreted as physical addresses. For example, the MMU may only allow the first address translation mode which uses the intermediate addresses to be selected when the MMU is in the safety mode. Also, if switching from the safety mode to the performance mode, then the MMU may force all devices to use the second translation mode. FIG. 1 is a schematic diagram of a data processing arrangement in a virtualized environment. In FIG. 1, various units are connected via an interconnect arrangement 10. The units connected via the interconnect arrangement 10 include: a central processing unit (CPU) 20, a system memory 30 optionally including cache memory 32, one or more devices 40, 50 and a system memory management unit (SMMU) 60 including a translation lookaside buffer (TLB) 62. While the description below refers to accesses to "memory", it will be appreciated that this may also include accesses to the cache 32.

The SMMU is a type of MMU which is responsible for managing access to memory for a number of devices 40, 50, which may often be peripheral devices managed by the host CPU 20. The devices may include, for example, a peripheral user interface or data input/output devices such as a camera device. The present technique is particularly useful for a SMMU because a SMMU may often experience significant contention for MMU between the different devices, but it will be appreciated that the present technique could also be applied to other types of MMU.

Each of the devices 40, 50 is associated with a virtual machine (VM) or guest system in a virtual environment. The apparatus of FIG. 1 provides the devices with access to a virtual address space defined by virtual memory addresses. Each virtual machine sees its own address space which contains instructions and data for use by that virtual machine. Amongst other advantages, the use of virtual addressing allows a host operating system or hypervisor (HV) to control memory access by inhibiting one virtual machine from accessing or corrupting information used by another virtual machine. FIG. 1 provides an example of such an arrangement in which a host data processing system which provides a virtual operating environment for one or more guest data processing systems.

The system memory is addressed by physical addresses. Therefore when a device requests access to a virtual memory address, for example to read or to write either an instruction or a data item, the virtual memory address is translated into a physical memory address so that the required information can be obtained from or written to the system memory 30. The translation of memory addresses is carried out by the SMMU 60. More details will be given of the SMMU operation below.

The TLB 62 provides a caching function in the memory address translation process. The TLB 62 stores recently or commonly used translations between virtual and physical memory addresses. So, as a first step in an address translation process, the TLB 62 is consulted in order to detect whether the TLB already contains the required address translation. If not, then a more involved translation process may be used, for example involving consulting so-called page tables holding address translation information, typically resulting in the TLB 62 then being populated with details of the required translation.

The virtualized system of FIG. 1 makes use of multiple stage address translation. In this arrangement, two levels of translation are used. A virtual address (VA) required by an executing program or other system module in one of the devices 40 is translated to an intermediate physical address (IPA) by a first MMU stage. As far as the VM software is aware, the IPA is a physical address used to access the system memory. However, the virtualized system provides a second level of address translation such that the IPA is then translated to a physical address (PA) by a second MMU stage. The IPA to PA translation is wholly under the control of the hypervisor. So, a particular VM may be exposed to the VA to IPA translation, whereas the hypervisor has oversight of the IPA to PA translations and therefore control of real accesses to the physical system memory.

In some examples, each device 40, 50 may be associated with a respective virtual machine. In other examples, multiple devices may be associated with a single virtual machine. In terms of communication between the devices and the SMMU 60, the devices may each be associated with a respective "stream" identifier (stream ID) which, among other functions, can assist with routing SMMU transactions to and from the devices.

FIG. 1 shows the use of one SMMU 60. In other examples, such as that shown in FIG. 2, the memory management unit functionality may be, in part, distributed in that TLBs may be respectively associated with each device, so that translation takes place locally to the device but, in the case of required translation not being found in the respective TLB (a TLB "miss") reference is made to a central MMU for resolution of the required translation. However, for the purposes of the discussion which follows, either arrangement is applicable.

Figure 2:
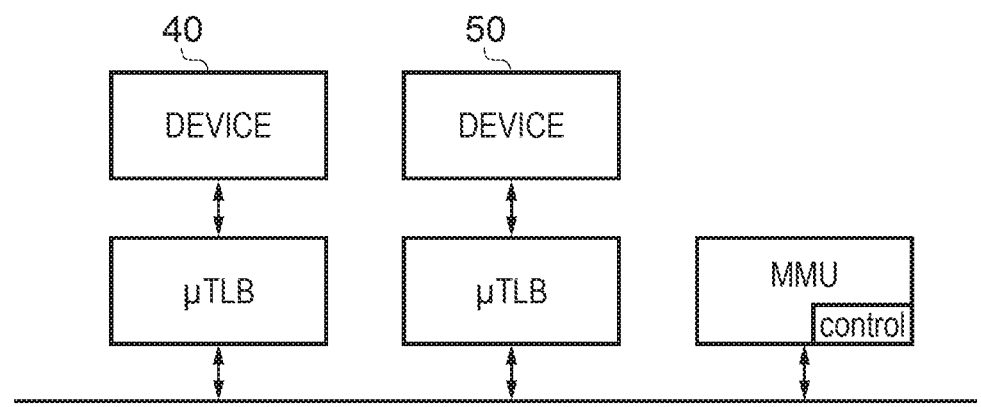

Note also that FIGS. 1 and 2 are schematic illustrations of the physical structure of the data processing arrangement. The logical structure provides one or more VMs and a HV. The VMs and the HV exist as different software processes running on the CPU 20, for example with different respective levels of operating privilege. So, a common CPU, running different respective software (which may be stored in the system memory 30), can provide the functionality of the VM(s) and the HV.

Figure 3:
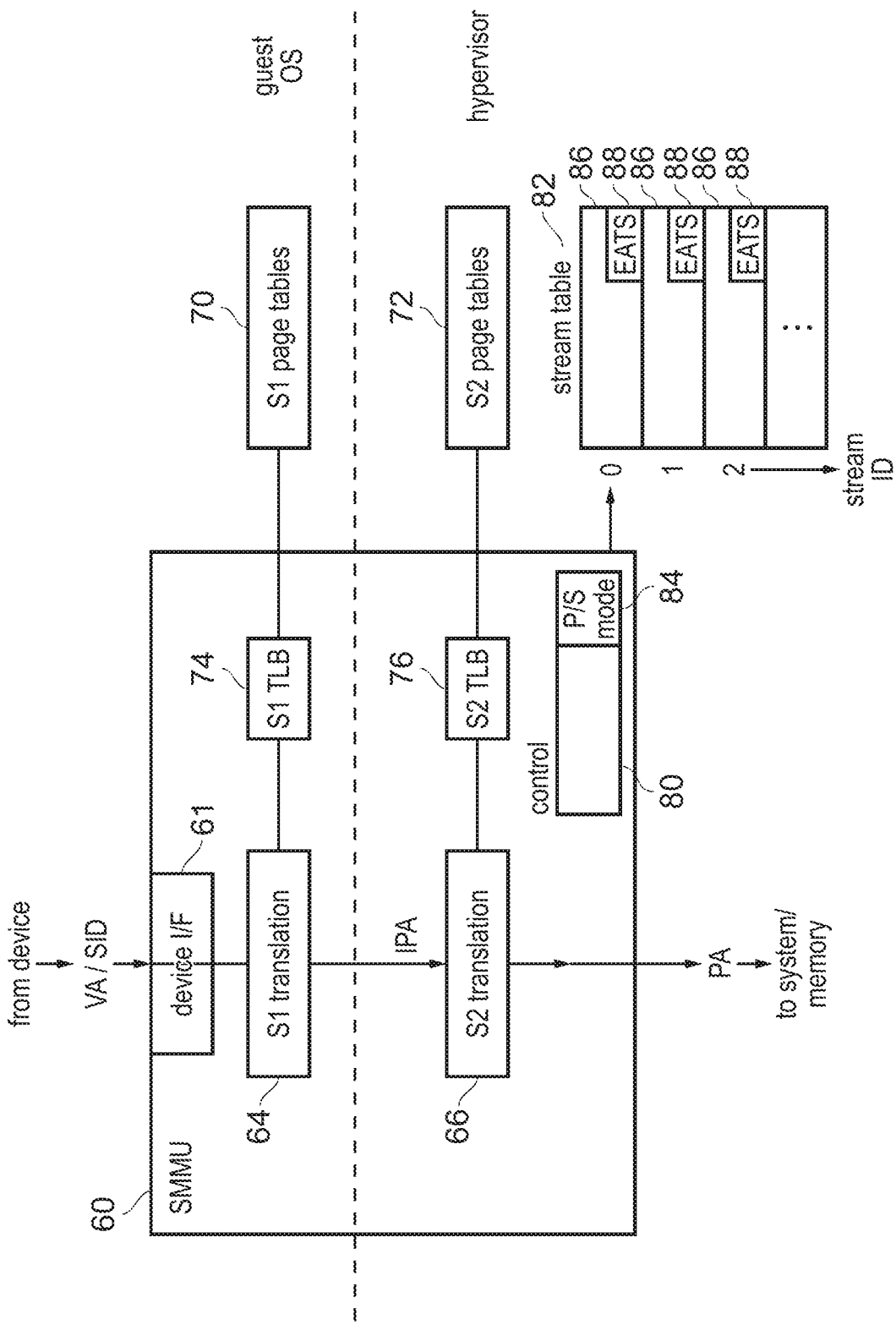
FIG. 3 illustrates an example of an address translation performed by the MMU.

As shown in FIG. 3, the SMMU 60 has a device interface 61 for receiving requests from the devices 40, 50 and transmitting responses to the devices 40, 50. For example, the SMMU 60 may be coupled to the devices 40, 50 via a bus such as a PCI bus, and the device interface 61 may implement the bus protocol used for transmitting signals over the bus.

FIG. 3 illustrates an example of performing address translation in response to a non-translated memory access request from one of the devices 40, 50. The non-translated memory access specifies a virtual address (VA) as well as a stream identifier (SID) as discussed above. The VA is translated into a physical address (PA) to be used to access the memory system including a cache 32 or main memory 30. As shown in FIG. 3, the SMMU 60 performs the translation in two stages using a stage one (S1) translation 64 for translating the VA to an intermediate physical address (IPA) and a stage two (S2) translation 66 for translating the IPA to a corresponding PA. The S1 and S2 translations 64, 66 are shown logically as separate units in FIG. 3 but it will be appreciated that in some implementations at least some circuitry for performing the two translations may be shared. The S1 and S2 translations are performed based on control data which includes S1 page tables 70 and S2 page tables 72 stored within the memory system 30, 32; S1 and S2 TLBs 74, 76 which cache a subset of the translation data from the S1 and S2 page tables 70, 72 respectively; a control register 80 for defining configuration data for the SMMU 60; and a stream table 82 which defines control information for each device or context which may issue access requests through the SMMU. The control data may also include queues for tracking memory access or address translation commands to be processed by the SMMU 60, or tracking events detected by the SMMU 60 which are to be reported to a device 40, 50 (e.g. the events could comprise page faults, access permission violations, etc.).

The S1 page table 70 provides information defining how to perform the S1 address translation 64 of VAs to IPAs. The S1 page tables are set by the CPU 20 under control of the guest operating system or virtual machine. The S1 page table 70 may define, for each page of the virtual address space, a mapping between a page portion of the virtual address and a page portion of the corresponding intermediate physical address (typically the address also includes an offset portion which remains unchanged during the translation). The S1 page table 70 may also define access permission data for controlling whether to allow a memory access to a given address from a particular device or context. The S1 page table 70 may include several levels of page table. When an S1 translation is required, if the required page table entry is not in the S1 TLB 74 then a page table walk operation is performed to fetch the entry from one of the levels of S1 page tables 70 in memory, and when the required page table entry is brought into the S1 TLB 74 then the S1 translation 64 can proceed. The page table walk operation may be relatively slow and if there is significant contention between different devices or contexts for space in the S1 TLB 74 then this may reduce the performance of the SMMU since it will not be possible to service memory access requests as quickly.

Similarly, the S2 page tables 72 define mappings between the page portions of IPAs and PAs (again an offset portion of the address may remain unchanged), and permission data for controlling whether to permit an access to a given address. The S2 page tables are set under control of the hypervisor. Again, a S2 TLB 76 is provided on chip within the SMMU for caching some of the page table entries from the S2 page table 72, and page table walks can be performed to fetch required page table entries into the S2 TLB. The PA returned by the S2 translation 76 can then be used to access the memory system 30, 32.

The control register 80 includes configuration data for the SMMU, including a mode flag 84 which defines whether the SMMU is in a performance mode or a safety mode, which will discussed in more detail below.

The stream table 82 may be provided either within the memory system 30, 32 or within local storage within the SMMU 60, such as a set of registers or a local cache. The stream table 82 includes a number of stream table entries 86 which are indexed by the stream ID specified in an access request received by the SMMU. Each device or context with which the SMMU may be accessed may be allocated a different stream ID.

Each stream table entry 86 includes control information associated with the particular device or context issuing the access request. For example the stream table entry 86 may include pointers to the S1, S2 page tables 70, 72 in memory to be used for requests having the corresponding stream ID. Hence, different devices/contexts may be provided with different translation data and permissions by accessing different page tables. This is why there may often contention in the S1 TLB 74, when several streams require different entries to be fetched into the S1 TLB 74 and there is not enough space for all the entries. Also the stream table entry 86 may include an "enable address translation service" (EATS) field 88 which defines the address translation mode to be used for handling address translation requests specifying the corresponding stream ID. There may be a number of different modes provided. Also, the EATS field 88 may specify whether handling of address translation requests and translated accesses is disabled altogether. If address translation services are disabled then any address translation request or translated memory access request is rejected. If address translation services are enabled, the EATS 88 field may indicate one of two different address translation modes.

Figure 4:
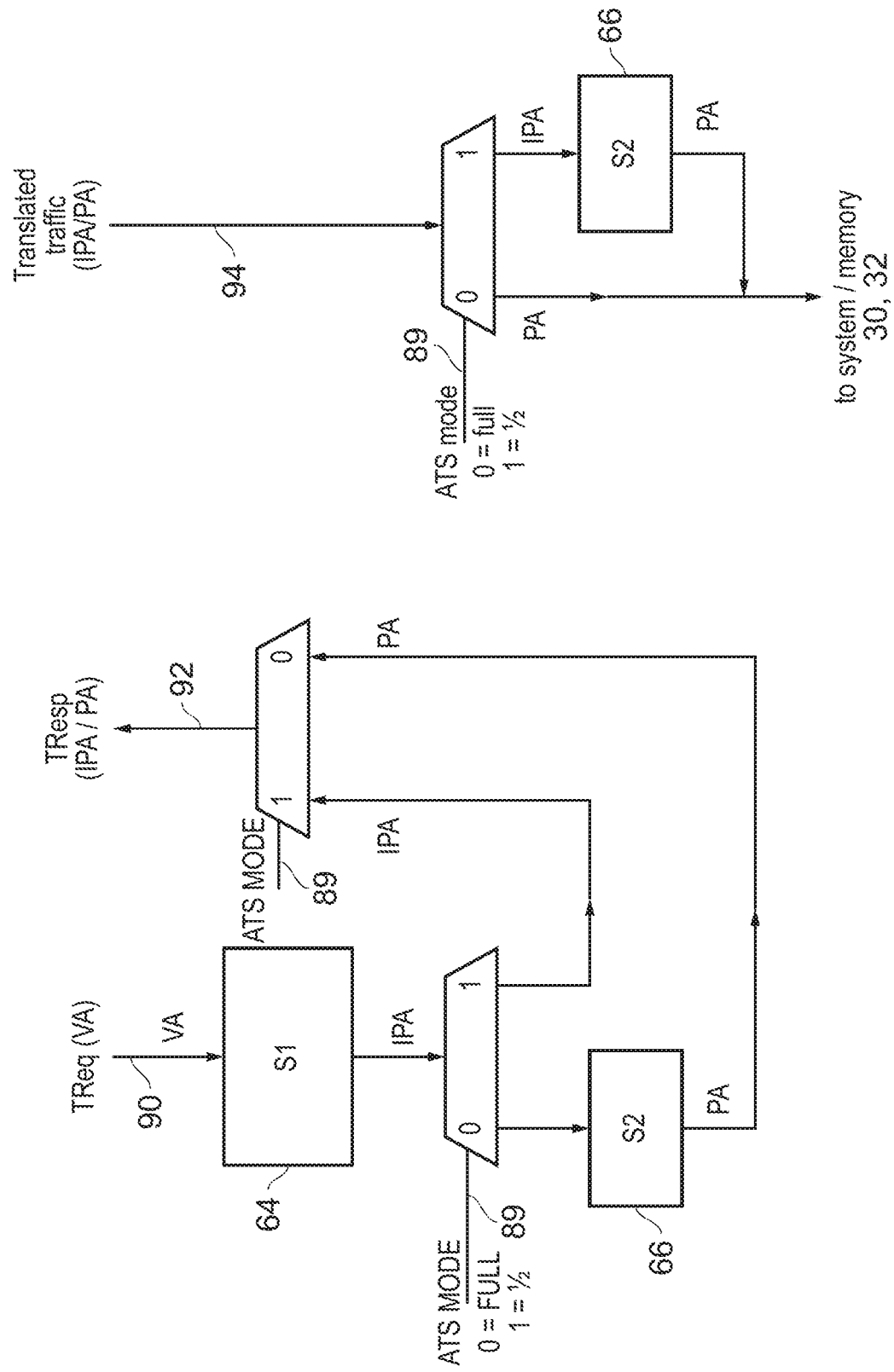
FIG. 4 shows an example of handling address translation requests and translated memory access requests.

FIG. 4 illustrates the handling of address translation requests and translated memory accesses using the two address translation modes. The left hand part of FIG. 4 shows schematically the handling of an address translation request 90 sent from the one of the devices 40, 50 which specifies a virtual address to be translated. The address translation request is typically sent ahead of time, when a memory access is not yet required. In response to the address translation request 90, the SMMU provides a translation response 92 to the device specifying a translated address, which can then be cached within the device 40, 50 until the memory access to that address is actually required. When the memory access is required, the device sends a translated memory access request 94 which specifies the translated address which was previously received in the translation response 92. By performing some translation ahead of time, the actual memory access is not delayed by contention for TLB resource, improving performance.

As shown in FIG. 4, the SMMU may support a full address translation mode and a half address translation mode. The mode to use is selected based on a mode selecting value 89 which may be derived from the EATS field 88 in the stream table entry 86 corresponding to the stream ID specified in the request.

In the full address translation mode, the VA specified in the translation request 90 is subject to the S1 translation 64 to generate a corresponding IPA, and the IPA is subject to the S2 translation 66 to generate a corresponding PA, which is returned to the device 40, 50 in the translation response 92. In the full address translation mode, the translated memory access 94 specifies the PA, which can be used directly for a memory access without further translation.

On the other hand, when the half translation mode is used then only the S1 translation mode is performed at the time of the address translation request 90, so that the VA is translated into the IPA, but the S2 translation 66 is omitted. The translation response 92 is sent to the device specifying the IPA obtained from the S1 translation 64. In the half translation mode, the translated access request 94 specifies an IPA, and so at this time the S2 translation 66 is performed to translate the IPA into a PA to be used for the memory access.

Hence, the two different modes provide a balance between security on the one hand and performance on the other hand. Exposing physical addresses which directly specify locations and memory can provide a security risk because as shown in the right part of FIG. 4 the device can then issue translated traffic specifying a physical address which can lead to a memory access without any further translation or checking of the access permissions. If the end device can be trusted to only issue translated traffic for physical addresses which were previously returned following the address translation request 90, then it can be assumed that the S1 and S2 translation 64, 66 (including any access permission checks enforced by the operating system and hypervisor) have both already been performed and so this access is safe. Hence, by selecting the full translation mode for trusted devices or contexts, performance can be improved by allowing translated traffic to be handled very quickly.

On the other hand, for devices or contexts which cannot be trusted, the half translation mode can be selected to avoid exposing physical addresses to the device. While the S2 translation is still required at the time of the translated memory request 94, the S2 translation is less likely to encounter delays due to contention than the S1 translation, so most of the performance benefit of performing translations ahead of time comes from performing the S1 translation in advance, not the S2 translation, so the half translation mode still improves performance. The half translation mode allows advance address translation to be used even with off the shelf devices which are potentially untrusted, so that the performance benefits of advance address translation can be used in a wider range of data processing systems. Also, there may be some functionality which depends on address translation services being available, such as the PRI functionality of a PCI bus coupling the devices to the SMMU, and so by enabling address translation services to be used more widely this can also enable other optimisations or functionality to be used more widely.

The mode flag 84 of the SMMU controls whether the SMMU is in a performance mode or safety mode. In the performance mode, the SMMU may treat all address translation requests and translated memory access traffic according to the full translation mode. This can be selected if all devices are trusted, so that there is no need incur a delay in checking the stream table entry to determine whether to use the full or half translation mode, improving performance. In the safety mode, the SMMU may check the stream table entry before handling any address translation requests or translated traffic, to ensure that physical addresses are not exposed to untrusted devices. Hence, this can be selected if there is at least one potentially untrusted device, to maintain security. The SMMU may prevent the EATS field 88 being set to indicate the half translation mode if the current mode of the SMMU is the performance mode.

Figure 5:
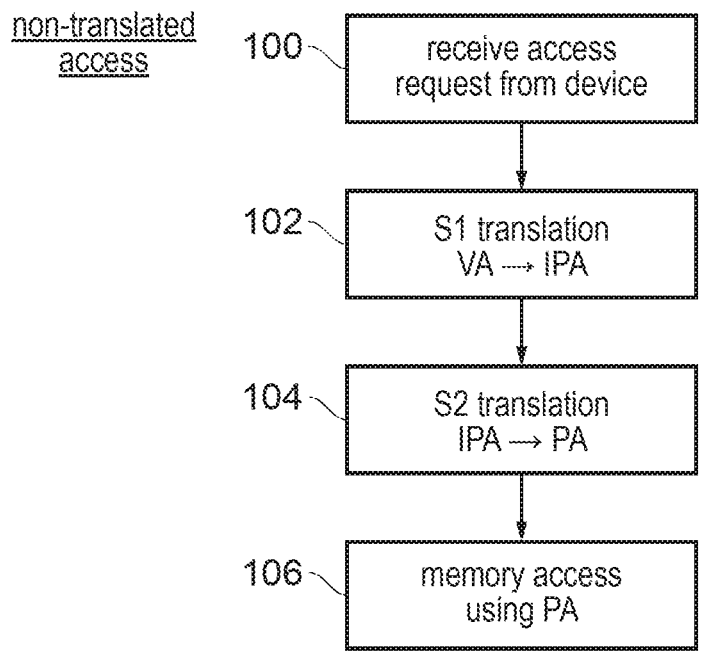
FIG. 5 is a flow diagram showing an example of handling a non-translated access request.

FIG. 5 shows a method of handling a non-translated memory access using the SMMU. At step 100 the SMMU 60 receives an access request specifying a VA and stream ID from one of the devices 40, 50. At step 102 the S1 translation 64 translates the VA into an IPA. If translation data corresponding to the specified address is not present within the S1 TLB 74 then the pointer to the S1 page table 70 is read from the stream table entry 86 corresponding to the stream ID specified in the access request, and a page table walk is performed to obtain the required translation data from the S1 page table 70. At step 104 the S2 translation 66 translates the IPA obtained in step 102 into a PA. Again, if the required data is not present in the S2 TLB 76 then a page table walk is performed using the S2 page tables 72 indicated by the S2 page table pointer within the corresponding stream table entry. At step 106 a memory access is performed using the PA obtained in the S2 translation 66. The memory access may be a read or a write.

Figure 6:
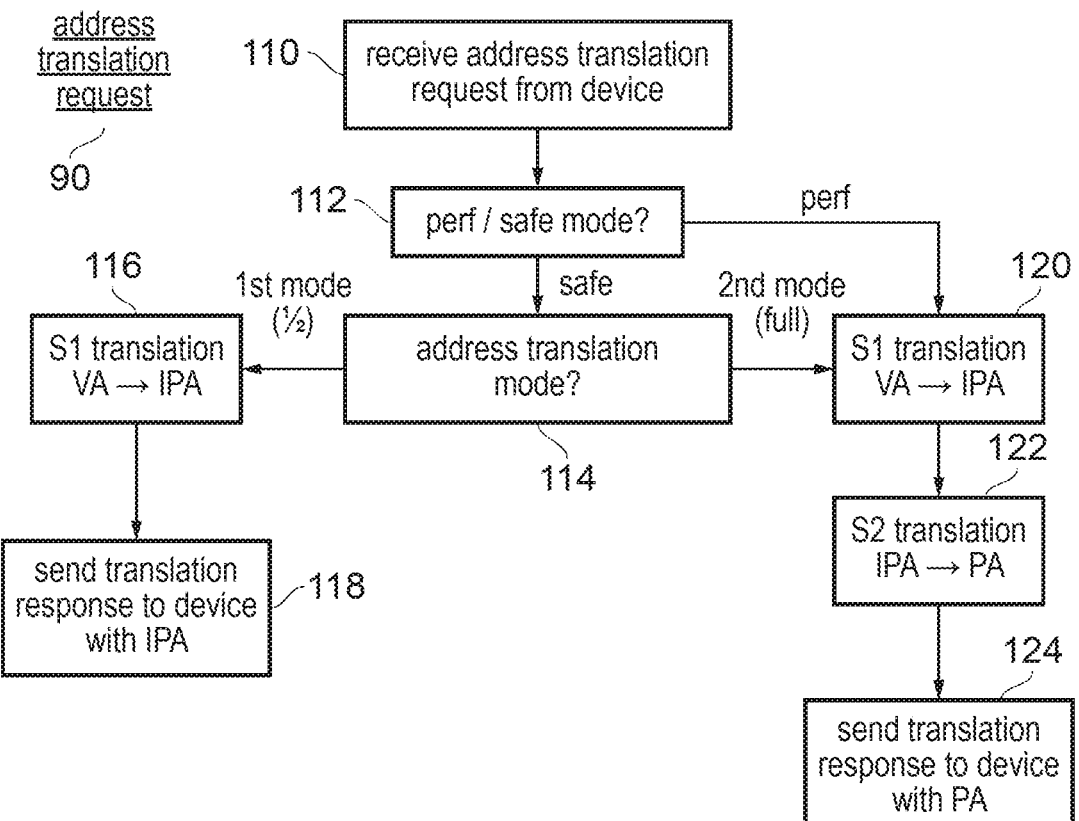
FIG. 6 is a flow diagram showing an example of handling an address translation request.

FIG. 6 shows a method of handling an address translation request received from one of the devices. At step 110 an address translation request is received from the device specifying a VA and a stream ID. At step 112, it is determined whether the SMMU 60 is in the performance mode or the safety mode, based on the mode flag 84. If the SMMU 60 is in the safety mode then at step 114 the SMMU checks the stream table entry 86 corresponding to the specified stream ID to determine the address translation mode. If the address translation mode is the half translation mode then at step 116 the S1 translation 64 is performed to translate the VA specified in the address translation request into an IPA, and at step 118 a translation response 92 is sent to the device specifying the IPA. On the other hand, if the address translation mode is the full translation mode then at step 120 the S1 translation is performed to translate the VA specified by the address translation request into an IPA, and at step 122 the S2 translation is also performed to translate the IPA into a PA. At step 124 a translation response 92 is sent to the device specifying the PA obtained in the S2 translation. If at step 112 the SMMU was determined to be in the performance mode, then step 114 is skipped and the address translation mode is assumed to be the full translation mode so that the method proceeds straight to step 120 to avoid any delay in checking the address translation mode specified in the stream table 82.

Figure 7:
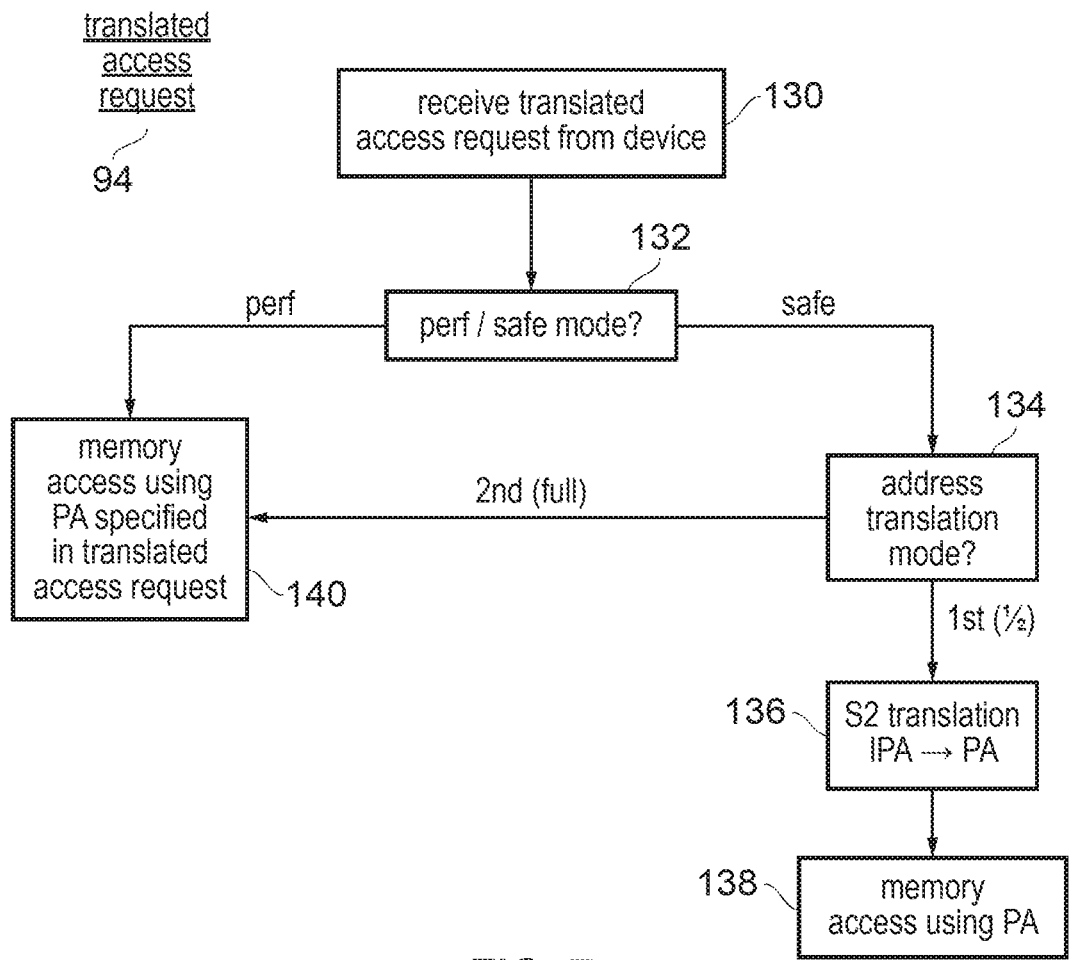
FIG. 7 is a flow diagram showing an example of handling a translated access request.

FIG. 7 shows a method of handling a translated access request 94. At step 130 a translated access request is received from one of the devices 40, 50, specifying a stream ID and a translated address, which may be an IPA or PA depending on the address translation mode being used for that device. At step 132 it is determined whether the SMMU is currently in the performance mode or the safety mode. If the SMMU is in the safety mode then at step 134 the address translation mode for the current stream ID is determined from the stream table 82. If the address translation mode is the half translation mode then at step 136 the S2 translation 66 is performed to translate the IPA specified by the translated access request into a PA, and at step 138 a memory access is performed using the PA obtained in step 136. If the address translation mode is the full translation mode, then at step 140 a memory access is performed using the PA specified in the translated access request without requiring any further translation. If at step 132, the current mode of the SMMU is the performance mode, step 134 is omitted and the request is handled according to the full address translation mode, so the method proceeds straight from 132 to step 140.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes and modifications can be effected therein by one skilled in the art without departing from the scope of the appended claims.

I claim:

1. A memory management unit comprising:
an interface configured to receive an advance address translation request from a device, the advance address translation request specifying a virtual address to be translated, the virtual address corresponding to a memory location to be accessed at a later time in response to a subsequent translated access request received from the device, where said memory location corresponding to the virtual address is not accessed in response to the advance address translation request; and
translation circuitry configured to translate the virtual address specified by the advance address translation request into an intermediate address different from a physical address directly specifying said memory location;
wherein the interface is configured to provide an address translation response comprising the intermediate address to the device in response to the advance address translation request.

2. The memory management unit according to claim 1, wherein in response to a translated access request received by the interface from the device, the translated access request specifying the intermediate address, the translation circuitry is configured to translate the intermediate address into a corresponding physical address.

3. The memory management unit according to claim 1, wherein in response to a non-translated access request received by the interface from the device, the non-translated access request specifying a virtual address, the translation circuitry is configured to translate the virtual address into a corresponding physical address.

4. The memory management unit according to claim 3, wherein in response to the non-translated access request, the translation circuitry is configured to perform a first translation to translate the virtual address into a corresponding intermediate address, and to perform a second translation to translate the intermediate address into said corresponding physical address.

5. The memory management unit according to claim 4, wherein the translation circuitry is configured to perform the first translation based on first control data set under control of a first control program executed by a processing unit, and to perform the second translation based on second control data set under control of a second control program executed by the processing unit.

6. The memory management unit according to claim 1, comprising control circuitry configured to control processing of a memory access using the physical address obtained by the translation circuitry.

7. The memory management unit according to claim 1, wherein in a first address translation mode, in response to the advance address translation request the translation circuitry is configured to translate the virtual address into the intermediate address and the interface is configured to provide the address translation response specifying the intermediate address; and
in a second address translation mode, in response to the advance address translation request the translation circuitry is configured to translate the virtual address into the physical address and the interface is configured to provide the address translation response specifying the physical address.

8. The memory management unit according to claim 7, wherein the translation circuitry is configured to select whether to use the first address translation mode or the second address translation mode in dependence on control information accessible to the translation circuitry.

9. The memory management unit according to claim 8, wherein the control information specifies, separately for each of a plurality of devices or contexts, whether to use the first address translation mode or the second address translation mode for requests received from that device or context.

10. The memory management unit according to claim 1, wherein in the first address translation mode, in response to a translated access request received by the interface, the translation circuitry is configured to translate an intermediate address specified by the translated access request into a corresponding physical address to be used for a memory access; and
in the second address translation mode, in response to a translated access request received by the interface, the memory management unit is configured to provide the physical address specified by the translated access request to be used for a memory access.

11. The memory management unit according to claim 10, wherein the memory management unit has a plurality of operating modes including:
a performance mode in which, in response to a translated access request received by the interface, the memory management unit is configured to allow a memory access to proceed using an address specified by the translated access request without checking whether to use the first address translation mode or the second address translation mode; and a safety mode in which, in response to a translated access request received by the interface, the translation circuitry is configured to check whether to use the first address translation mode or the second address translation mode for the translated access request before allowing any memory access to proceed in response to the translated access request.

12. The memory management unit according to claim 11, wherein the memory management unit is configured to prohibit use of the first address translation mode when the memory management unit is in the performance mode.

13. The memory management unit according to claim 1, comprising a control storage element configured to store control information indicating whether the memory management unit is in the performance mode or the safety mode.

14. A data processing apparatus comprising a memory management unit according to claim 1.

15. A memory management unit comprising:

means for receiving an advance address translation request from a device, the advance address translation request specifying a virtual address to be translated, the virtual address corresponding to a memory location to be accessed at a later time in response to a subsequent translated access request received from the device, where said memory location corresponding to the virtual address is not accessed in response to the advance address translation request;

means for translating the virtual address specified by the advance address translation request into an intermediate address different from a physical address directly specifying said memory location; and means for providing an address translation response comprising the intermediate address to the device in response to the advance address translation request.

16. A method comprising:

receiving, at an interface of a memory management unit, an advance address translation request from a device, the advance address translation request specifying a virtual address to be translated, the virtual address corresponding to a memory location to be accessed at a later time in response to a subsequent translated access request received from the device, where said memory location corresponding to the virtual address is not accessed in response to the advance address translation request;

translating, using translation circuitry, the virtual address specified by the advance address translation request into an intermediate address different from a physical address directly specifying said memory location; and providing, from said interface, an address translation response to the device, the advance address translation response comprising the intermediate address.

* * * * *